W. H. CHAFFEE.
Measuring Distances.

No. 34,879.

Patented April 8, 1862.

Witnesses
J W Coombs
G W Reed

Inventor
W H Chaffee
per Munn & Co
Attorneys

UNITED STATES PATENT OFFICE.

WILLIAM H. CHAFFEE, OF FLINT, MICHIGAN.

IMPROVEMENT IN INSTRUMENTS FOR MEASURING DISTANCES.

Specification forming part of Letters Patent No. 34,879, dated April 8, 1862.

*To all whom it may concern.*

Be it known that I, WILLIAM H. CHAFFEE, of Flint, in the county of Genesee and State of Michigan, have invented a new and Improved Instrument for Measuring Distances; and I do hereby declare that the following is a full, clear, and exact description of the same, reference being had to the accompanying drawings, forming part of this specification, in which—

Figure 1:
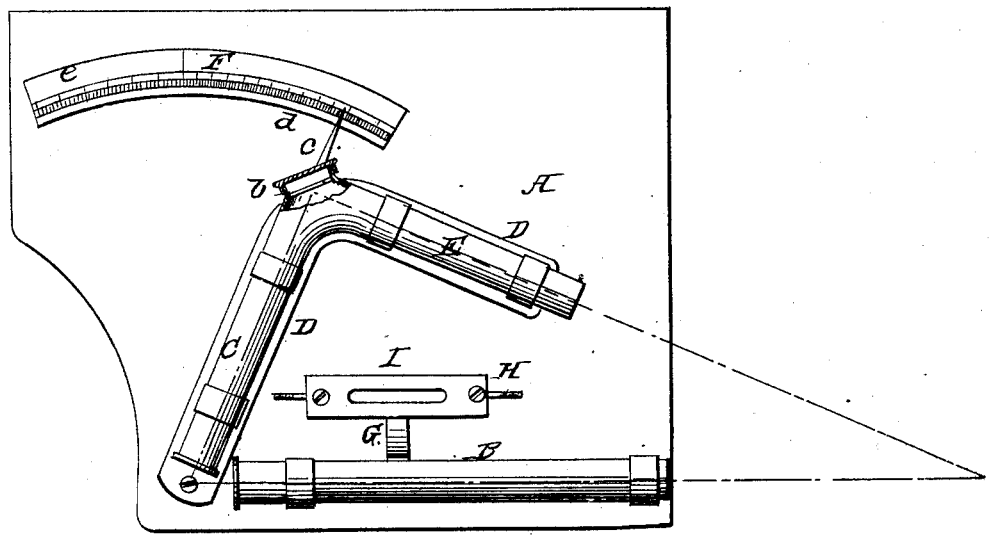
Figure 2:
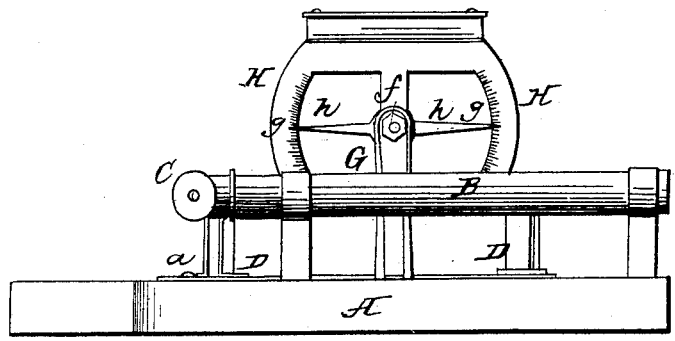

Figure 1 is a plan of the instrument, partly in section; and Fig. 2, a side elevation of the same.

Similar letters of reference indicate corresponding parts in both figures.

The object of this instrument is to measure distances without going over them.

It consists of two telescopes, an angular reflecting-tube, an index, and a scale, combined and operating in the following manner:

A is a flat board, to which the several parts of the machine are attached, intended to be supported upon a tripod-stand in such manner as to permit it to be adjusted in any required position.

B is a telescope fitted with cross-wires and secured upon the board A in a fixed position parallel with the upper face of the same.

C is a second telescope attached to a frame D, which is arranged to move in planes parallel with the upper face of the stand A upon a pin $a$, whose axis is in the same plane with but perpendicular to the axis of the telescope B.

The telescope C is arranged so that its axis is in the same plane parallel with the board A as the axis of the telescope B, and in such manner that if both of said axes were prolonged beyond the eyeglasses they would meet each other at a point in line with the perpendicular axis of the pin $a$, about which C moves, as indicated by the red lines in Fig. 1.

The eyeglasses of the two telescopes are at their contiguous ends and as close together as will admit of one or the other being looked through at pleasure. To the movable telescope C there is attached what I call the "angular reflecting-tube" E, whose axis occupies a position at right angles to the axis of the said telescope, and is also in the plane common to the axis of both telescopes. At the junction of the telescope C and tube E there is placed within the elbow formed between them a plane reflector $b$, set with its face at an angle of forty-five degrees to the axes of the said telescope and tube, so that by looking through the telescope objects may be seen through the tube. The tube is fitted with cross-wires like those commonly used in the telescopes of surveying-instruments. The frame D has attached to it the index $c$, the point of which is in the same plane perpendicular to the face of the board A as the axis of the telescope C, such index working over an arc-formed plate F, secured to the board A, such plate having engraved or inscribed upon it two scales $d$ and $e$, concentric with the pin $a$.

To measure the distance of any object from the point where the instrument is placed, the instrument is first set in such a position that the telescope B bears directly upon the object, and while it is fixed in this position the frame D, with the attached telescope C and reflecting-tube E, is turned on the pin $a$ to such a position that the object can be seen by looking through the telescope C, and the distance of the object is then indicated upon the scale $d$. The scale is constructed by the mathematical rule which enables the length of the hypotenuse of a right-angled triangle to be obtained when the length of the base and the angle formed with it by the hypotenuse are known.

Figure 3:
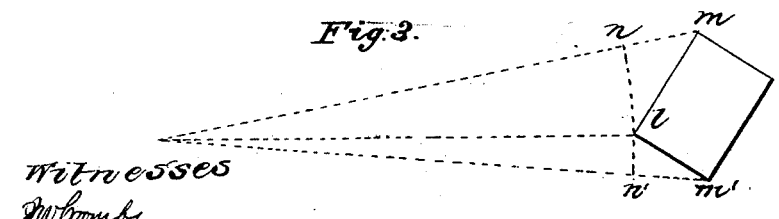

The mode of measuring the distance apart between two objects—as the width of a building at a distance—is illustrated in the diagram Fig. 3. First set the instrument at a convenient point $p$ with respect to the building, and find by the mode above described the distances from the said point of the corners $l\ m$ of the building, and subtract the first distance from the last, which gives the distance from $n$ to $m$. Then set one telescope to sight $l$ and the other to sight $m$, and multiply the number to which the index points on the scale $e$, which is graduated to represent inches, by the number of yards or rods which $l$ is distant from $p$, and the quotient is the distance from $l$ to $n$ in inches. Next multiply the distances $n\ l$ and $n\ m$, and the square root of the quotient will be the distance from $l$ to $m$, or the width of that side of the building. The side $l\ m'$ can be measured in the same manner.

There is also attached to the board A a contrivance for measuring elevations—as the heights of buildings—consisting of a stand G, having attached to it a circular or sector-shaped plate H, which is arranged to oscillate on a fixed center-pin $f$. To this plate is attached a spirit-level I, and on one face of it is a scale $g\ g$, and attached to the pin $f$ there is a fixed index $h$, which occupies a position parallel with the board A. To measure the height of a building, first measure the distance from the point where the instrument is placed to a point in the base of the building, and take the elevation or depression of the base from a horizontal line by means of the spirit-level and scale $g\ g$, which is graduated to represent inches. Then elevate the instrument so that the telescopes point to the top of the building, and take the elevation from the horizontal line by means of the spirit-level and scale. If the base was elevated subtract its elevation, as indicated on the scale, from that of the top; or, if the base was depressed, add the depression to the elevation of the top and multiply the number thus obtained by the number of rods the building is distant, and the quotient gives the height of the building in inches.

What I claim as my invention, and desire to secure by Letters Patent, is—

The combination of the two telescopes B C, the angular reflecting-tube E, the index $c$, and the scale or scales $d\ e$, the whole combined to operate substantially as and for the purpose herein specified.

WILLIAM H. CHAFFEE.

Witnesses:
  H. A. SUTHERLAND,
  JAMES A. WIRNER.